United States Patent
Annamalai et al.

(10) Patent No.: US 10,503,714 B2
(45) Date of Patent: Dec. 10, 2019

(54) DATA PLACEMENT AND SHARDING

(71) Applicant: Facebook, Inc., Menlo Park, CA (US)

(72) Inventors: Muthukaruppan Annamalai, Redmond, WA (US); Sumeet Ungratwar, Sunnyvale, CA (US); Daniel Arraes Pereira, Seattle, WA (US); Benjamin Francois Marie Renard, San Francisco, CA (US); Sameet Harishanker Agarwal, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 181 days.

(21) Appl. No.: 15/611,931

(22) Filed: Jun. 2, 2017

(65) Prior Publication Data

US 2018/0349419 A1    Dec. 6, 2018

(51) Int. Cl.
  *G06F 16/00* (2019.01)
  *G06F 16/22* (2019.01)
  *G06F 16/21* (2019.01)
  *G06F 16/20* (2019.01)

(52) U.S. Cl.
  CPC ............ *G06F 16/22* (2019.01); *G06F 16/214* (2019.01)

(58) Field of Classification Search
  None
  See application file for complete search history.

(56) References Cited

U.S. PATENT DOCUMENTS

| | | | | |
|---|---|---|---|---|
| 7,647,329 | B1* | 1/2010 | Fischman | G06F 3/0607 707/999.1 |
| 8,880,841 | B2* | 11/2014 | DeJana | H04L 67/1095 711/173 |
| 8,965,921 | B2* | 2/2015 | Gajic | G06F 16/21 707/770 |
| 9,558,207 | B1* | 1/2017 | McAlister | G06F 16/1727 |
| 10,025,867 | B2* | 7/2018 | Kabiljo | G06F 16/9535 |
| 10,298,259 | B1* | 5/2019 | Lazier | H03M 13/03 |

(Continued)

OTHER PUBLICATIONS

Tatemura et al. "Microsharding: A Declarative Approach to Support Elastic OLTP Workloads", ACM SIGOPS Operating Systems, dl.acm.org (Year: 2012).*

(Continued)

*Primary Examiner* — Polina G Peach
(74) *Attorney, Agent, or Firm* — FisherBroyles, LLP

(57) ABSTRACT

Data sharding partitions data associated with an application into multiple shards in which each shard stores a subset of the data. A shard is further divided into multiple microshards in which each microshard contains a subset of the shard data. A set of microshards are assigned to a specified shard. The assignment of microshards can change, e.g., when new shards are added and microshards are migrated from one shard to another shard. A microshard map, which indicates a mapping between the microshards and shards, is updated automatically when the assignments change. After identifying the shard to which a specified microshard is assigned using the microshard map, a data access request from a client device is automatically forwarded to the appropriate shard. Because data can be accessed efficiently regardless of whether the number of shards changes, the data sharding facilitates provisioning of the shards on a need basis.

20 Claims, 6 Drawing Sheets

(56) References Cited

U.S. PATENT DOCUMENTS

| | | | | |
|---|---|---|---|---|
| 10,324,790 B1* | 6/2019 | Franklin | | G06F 11/1076 |
| 2003/0115434 A1* | 6/2003 | Mahalingam | | H04L 67/1095 |
| | | | | 711/165 |
| 2010/0115226 A1* | 5/2010 | Ueno | | G06F 12/023 |
| | | | | 711/173 |
| 2010/0241629 A1* | 9/2010 | Tatemura | | G06F 16/25 |
| | | | | 707/741 |
| 2011/0202929 A1* | 8/2011 | Schleimer | | G06F 16/24549 |
| | | | | 718/106 |
| 2012/0143823 A1* | 6/2012 | Jain | | G06F 16/22 |
| | | | | 707/640 |
| 2013/0290249 A1* | 10/2013 | Merriman | | G06F 16/273 |
| | | | | 707/610 |
| 2014/0032579 A1* | 1/2014 | Merriman | | G06F 16/258 |
| | | | | 707/756 |
| 2014/0149794 A1* | 5/2014 | Shetty | | H04L 67/1095 |
| | | | | 714/20 |
| 2014/0188825 A1* | 7/2014 | Muthukkaruppan | | |
| | | | | G06F 16/134 |
| | | | | 707/694 |
| 2014/0372702 A1* | 12/2014 | Subramanyam | | G06F 12/0848 |
| | | | | 711/129 |
| 2015/0213358 A1* | 7/2015 | Shelton | | H04L 41/0604 |
| | | | | 706/47 |
| 2016/0110391 A1* | 4/2016 | Korycki | | G06F 16/2228 |
| | | | | 707/741 |
| 2016/0142475 A1* | 5/2016 | Kathuria | | H04L 67/1008 |
| | | | | 709/203 |
| 2016/0188426 A1* | 6/2016 | Kousha | | G06F 16/00 |
| | | | | 714/4.12 |
| 2016/0306854 A1* | 10/2016 | Hegde | | G06F 16/22 |
| 2016/0366220 A1* | 12/2016 | Gottlieb | | H04L 67/1095 |
| 2017/0116278 A1* | 4/2017 | Baby | | G06F 16/27 |
| 2017/0116334 A1* | 4/2017 | Kruglikov | | G06F 16/21 |
| 2017/0300490 A1* | 10/2017 | Kachemir | | G06F 7/24 |
| 2018/0032360 A1* | 2/2018 | Agarwal | | G06F 9/45558 |
| 2018/0157690 A1* | 6/2018 | Kabiljo | | H04L 67/1097 |

OTHER PUBLICATIONS

Novakovic et al. "An Analysis of Load Imbalance in Scale-out Data Serving", Jun. 16, 14-18, 2016, SIGMETRICS Antibes Juan-Les-Pins, France (Year: 2016).*

* cited by examiner

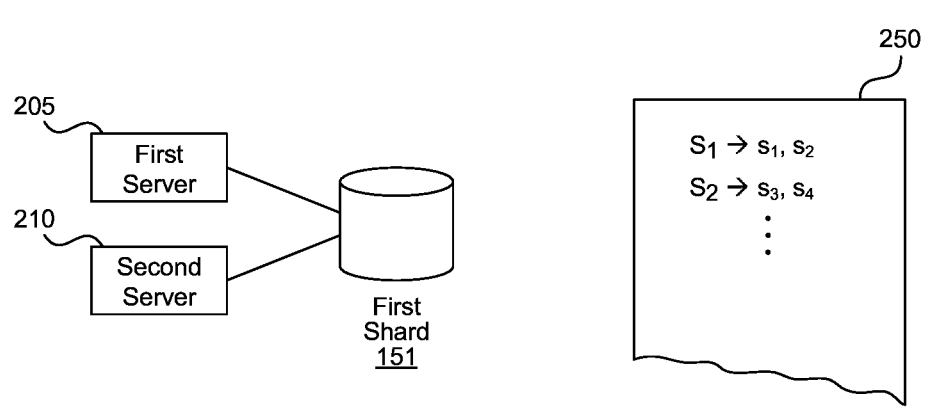
*FIG. 2A*  *FIG. 2B*
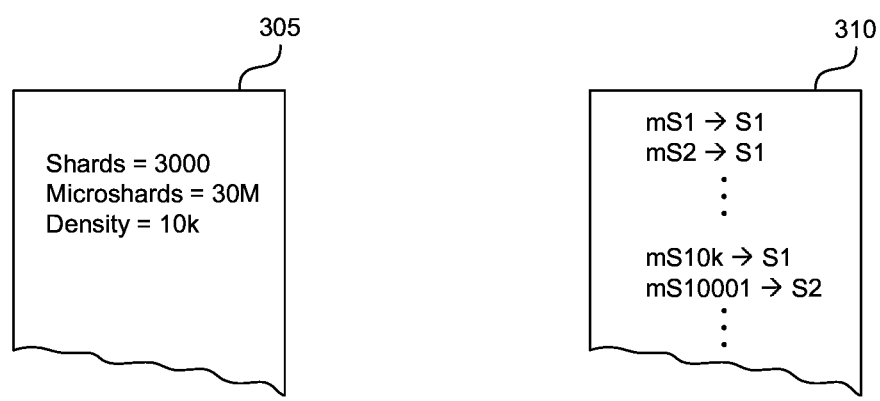
*FIG. 3A*  *FIG. 3B*

DATA PLACEMENT AND SHARDING

BACKGROUND

Some social networking platforms have many millions of users and manage a significant amount of data associated with the users. To manage the data efficiently, the social networking platforms use some data partitioning services. One such data partitioning service is data sharding, which statically creates data partitions ("shards"). The data is stored as multiple shards in which each shard stores a subset of the data. However, the data partitioning services often become inefficient over time. Typically, a client computing device ("client device") that consumes the data accesses the data using a shard identification (ID), which indicates the shard in which the requested data is stored. If the shard changes, e.g., new shards are added to accommodate ever growing data, the data allocation may change, e.g., data can be moved from one shard to another. When the allocation changes, the mapping or the formula used by the client devices to identify the shard in which the data is stored may have to be updated and this process consumes significant amount of computing resources as many client devices may have to be updated. Some social networking platforms avoid this problem by allocating or overprovisioning the shards, e.g., allocating more shards than required to store a specified amount of the data, thus resulting in wastage of data storage resources (e.g., server computing devices, rack space in data storage devices, power).

BRIEF DESCRIPTION OF THE DRAWINGS

FIG. 2A is a block diagram illustrating an example of a shard being hosted by a server, consistent with various embodiments.

FIG. 2B illustrates an example of a server-shard map, consistent with various embodiments.

FIG. 3A is a first representation of a microshard map of FIG. 1, consistent with various embodiments.

FIG. 3B is a second representation of the microshard map of FIG. 1, consistent with various embodiments.

DETAILED DESCRIPTION

Figure 1:
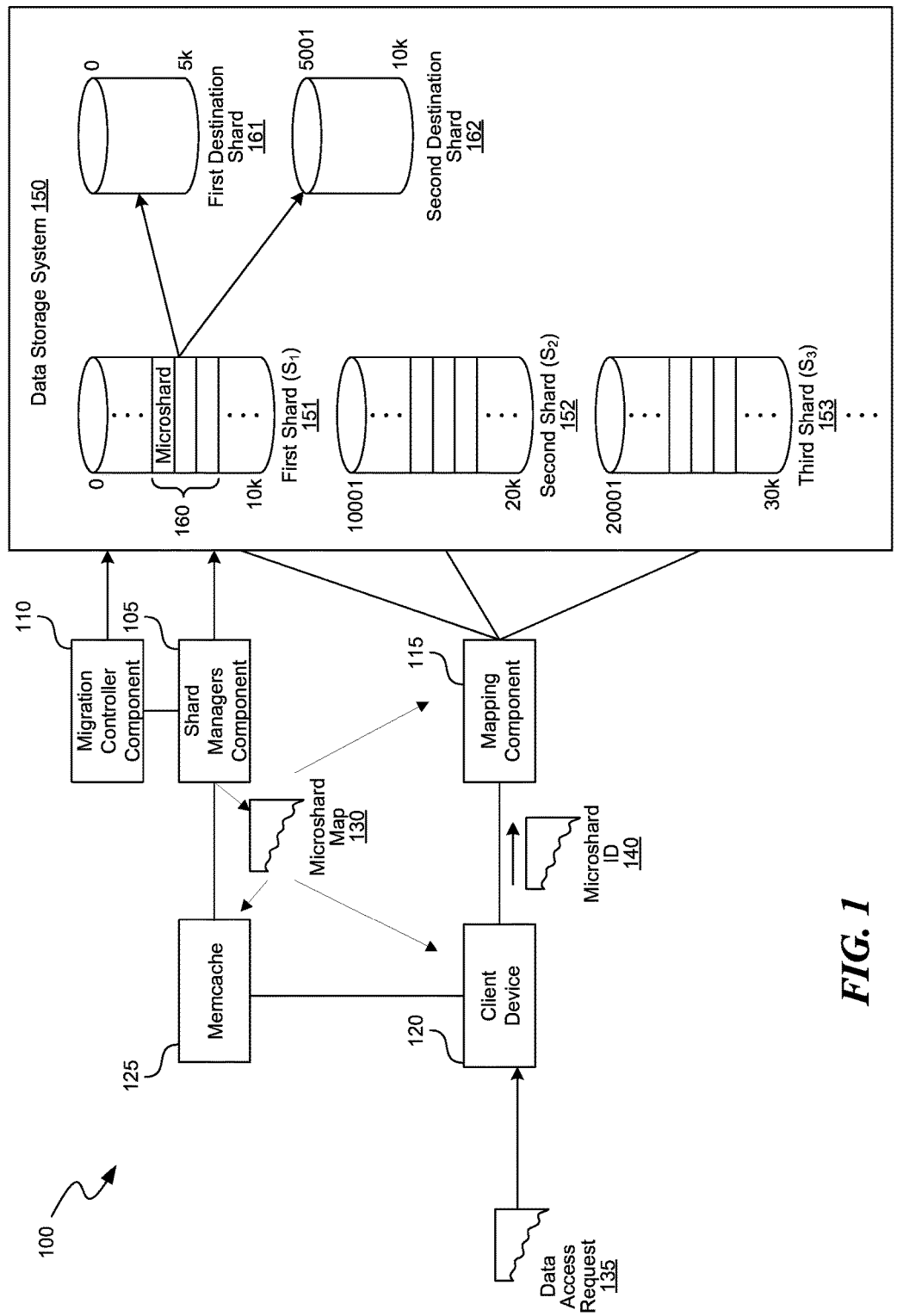
FIG. 1 is a block diagram illustrating an environment in which the disclosed data sharding embodiments can be implemented.

Embodiments are directed to data sharding in a distributed computing system. Data associated with an application, e.g., a social networking application, can be partitioned into shards in which each shard stores a subset of the data. In some embodiments, a shard is further divided into multiple microshards in which each microshard is a logical block of the shard and contains a subset of the data stored in the shard. A client computing device ("client device") can access specified data associated with the application using an identification (ID) of the microshard in which the specified data is stored. Although the microshards are assigned to a specified shard, the assignment can change, e.g., when the microshards are migrated from one shard to another shard. However, the embodiments provide the client device a continued access to the specified data using the same microshard ID regardless of whether the microshard assignments have changed. This results in significant reduction in computing overhead associated with data sharding when the stored data increases rapidly. A microshard map is used to identify a mapping between the microshards and the shards. A mapping component employs the microshard map to automatically forward a data access request from the client device to an appropriate shard. The microshard map is updated automatically when the assignments of the microshards change. Thus, with the data sharding, client devices would not have to update their sharding formula when the number of shards changes. Facilitating accessing of the data using microshards provides an efficient way to access the data regardless of whether data is moved to a new shard or another existing shard. Because data can be accessed efficiently regardless of whether the number of shards changes, the data sharding facilitates provisioning of the shards on as-needed basis, thereby minimizing the wastage of resources that can be caused due to overprovisioning of the shards as in prior data storage services.

A migration controller component facilitates the migration of microshards from one shard to another shard. The migration of a specified microshard is associated with three states, e.g., "not started," "in process," and "complete." The "complete" state indicates that a specified microshard is migrated from a source shard to a destination shard. The "not started" state indicates that the migration process of the specified shard has not yet started. The "in process" state indicates migration of the specified microshard from the source shard to the destination shard is in process. A shard can be hosted by one or more server computing devices ("servers") and data in the shard (and therefore, microshard) can be accessed using a server that hosts the shard. When the specified microshard is in the source shard, e.g., before the migration, a first server that hosts the source shard serves a data access request for the specified microshard. When the specified microshard is in the destination shard, e.g., after the migration, a second server that hosts the destination shard serves the data access request for the specified microshard.

Any data access request for a microshard that is associated with a migration request is processed based on a state of migration of the specified microshard. If the data access request is a read request, the data access request is forwarded to the first server to retrieve a data item from the specified microshard in the source shard regardless of the state of migration of the specified microshard. If the data access request is a write request for writing a data item to the specified microshard, the write request is forwarded to the source shard in an event the state of migration is "not started." If the state of migration is "complete," the write request is forwarded to the destination shard. If the state of migration is "in process," the write request is suspended for a specified duration, e.g., until the specified microshard is migrated to the destination shard. In some embodiments, all the write requests for the specified microshard is suspended until the migration state is "in process," and then batched and forwarded to the destination shard when the migration state changes to "complete." In some embodiments, the mapping component handles the above processing of data access request received from the client devices.

Turning now to Figures, FIG. 1 is a block diagram illustrating an environment 100 in which the data sharding embodiments can be implemented. The environment 100 includes a data storage system 150 that is implemented as a number of shards, e.g., a first shard 151, a second shard 152 and a third shard 153. The data storage system 150 can be used to store data associated with an application, e.g., a social networking application. The data can include user profile data, messages, comments, photos of users of the social networking application. Each shard can include a subset of the data associated with the application. Each shard can be implemented on one or more host machines having a data storage medium, e.g., hard drives, solid state drive (SSD).

A client device 120 can issue a data access request 135 for accessing data in the shards. The client device 120 can be any application service that consumes the data stored in the data storage system 150. In some embodiments, the data access request 135 can originate from a user.

A shard manager component 105 manages placement of data in the shards. Each shard contains a subset of the data associated with the application. For example, the first shard 151 can include data associated a first specified number of users of the social networking application, and the second shard 152 can include data associated a second specified number of users of the social networking application. The data stored in each of the shards can be distinct. In some embodiments, the shard manager component 105 manages the assignment of data to the shards, e.g., can make decisions as to which data has to be stored in which shard. The shard manager component 105 can make such decisions based on user-configurable policies.

In some embodiments, a shard is hosted by a server and data in the shard can be accessed via the server. FIG. 2A is a block diagram illustrating an example of a shard being hosted by a server, consistent with various embodiments. In the FIG. 2A, the first shard 151 is hosted by a first server 205. Any data access request for the data stored in the first shard 151 is forwarded to the first server 205. The first shard 151 is also associated with a second server 210. In some embodiments, the second server 210 acts as a secondary server, which processes the data access requests in an event a primary server, e.g., the first server 205, becomes unavailable. Other shards can also have such server assignments. In some embodiments, the shard manager component 105 determines the server shard assignments based on user-configurable policies. The shard manager component 105 can store the server shard assignments in a server-shard map. FIG. 2B depicts an example of a server-shard map, consistent with various embodiments. The server-shard map 250 indicates an assignment of the servers to the shards. In some embodiments, the server-shard map 250 can indicate both the primary server and the secondary server associated with a shard. For example, the server-shard map 250 indicates that the first shard 151, "S1," is associated with the first server 205, "s1," as a primary server and the second server 210, "s2," as the secondary server, and that the second shard 152, "S2," is associated with the third server, "s3," as a primary server and the fourth server, "s4," as the secondary server.

Referring back to FIG. 1, the shard manager component 105 divides each of the shards into a number of microshards. In some embodiments, a microshard is a logical portion or a block of the shard and includes a subset of the data stored in the shard. The number of microshards to be generated can be determined based on various factors, e.g., amount of data to be stored in the data storage system 150, and a total number of shards in the data storage system 150. The shard manager component 105 also determines a density of microshards, e.g., the number of microshards per shard. For example, in the environment 100, consider that the data storage system 150 has "3000" shards. The shard manager component 105 can generate "30 million (30 M)" microshards with a density of "10,000 (10K)." That is, the first shard 151 can have the first 10 k microshards, such as microshards 160, the second shard 152 can have the second 10 k microshards and so on. The number of microshards to be generated and the density can also be determined based on various user-configurable policies.

The data in the data storage system 150 can be addressed using a microshard ID. The client device 120 can access the data by specifying the microshard ID. In some embodiments, the microshard ID includes a sequence number. For example, a first microshard can have a microshard ID "mS1," a three thousandth microshard can have a microshard ID "mS3000," and so on. The shard manager component 105 assigns the microshards to the shards and generates a microshard map 130, which stores a mapping between the microshards and the shards. In some embodiments, the microshard map 130 is used to determine a shard to which a specified microshard is assigned.

FIG. 3A is a first representation 305 of the microshard map of FIG. 1, consistent with various embodiments. In the first representation 305, the shard manager component 105 stores a total number of shards, e.g., "3000," and microshards, e.g., "30M," in the data storage system 150 and a density of the microshards, e.g., "10K," in the microshard map 130. A mapping component 115 can determine a shard to which a specified microshard is assigned based on one or more of the values stored in the first representation 305. In some embodiments, the mapping component 115 can use a mathematical operation on a candidate microshard ID and the density value to determine the shard to which the candidate microshard is assigned. For example, the mapping component 115 can determine that a candidate microshard with microshard ID 5000 belongs to shard S1, by dividing microshard ID "5000" by density "10000" and adding "1" to the quotient if the reminder is greater than "0" to get the value "1," which is shard S1 ("5000/10000=0+1=1"). In another example, a candidate microshard with microshard ID "10000" belongs to shard S1 ("10000/10000=1+0=1"). In another example, a candidate microshard with microshard ID 10003 belongs to shard S2 ("10003/10000=1+1=2"). The density of the microshards can be a constant or can vary. In some embodiments, the density of the microshards is a constant for a given number of shards.

FIG. 3B is a second representation of the microshard map of FIG. 1, consistent with various embodiments. In the second representation 310, the shard manager component 105 stores an actual mapping between the microshards and the shards in the microshard map 130. For example, the shard manager component 105 stores a mapping "mS1->S1" to indicate that a microshard with microshard ID "1" is assigned to a shard with shard ID "S1." In some embodiments, the second representation 310 of the microshard map 130 can consume more storage space than the first representation 305 of the microshard map 130, especially when the number of microshards is significantly large. The shard manager component 105 can be configured to generate one of the two representations.

Referring back to FIG. 1, a migration controller component 110 manages the migration of microshards from one shard to another shard. The migration controller component 110 migrates the microshards based on a trigger, e.g., addition of a new shard, removal of an existing shard, and increase in data traffic on one or more shards. The trigger can be user-configurable. In some embodiments, the migration can be managed using a bot, e.g., a script that runs automated tasks. The bot can identify the trigger and command the migration controller component 110 to perform the migration. The bot can also specify the microshards to be migrated, the source shard and the destination shard. The migration of the microshards can be associated with at least three states, e.g., "not started," "in process," and "complete."

The mapping component 115 manages processing of the data access request 135 received from the client device 120. The mapping component 115 can be independent of a client device, e.g., separate from the client device, or integrated into the client device. The data access request 135 can be generated by the client device 120 or received at the client device 120 from another entity, e.g., another application or a user. In some embodiments, the data access request 135 includes a microshard ID 140 that corresponds to a microshard with which the data access request 135 is associated. The mapping component 115 employs the microshard map 130 for identifying the shard to which the data access request 135 is to be forwarded. When the data access request 135 is received at the mapping component 115, the mapping component 115 retrieves the microshard ID 140 from the data access request 135, identifies a specified shard, e.g., a first shard 151, with which a specified microshard corresponding to the microshard ID 140 is associated based on the microshard map 130, and forwards the data access request 135 to the first shard 151. In some embodiments, forwarding the data access request 135 to the first shard 151 includes identifying a specified server, e.g., the first server 205 of FIG. 2A, that is hosting the first shard 151 and forwarding the data access request 135 to the first server 205. The first server 205 can execute the data access request 135 on the first shard 151 and return a response, e.g., requested data in an event the data access request 135 is a read request or an acknowledgement that the write operation is performed successfully in an event the data access request 135 is a write request. In some embodiments, the first server 205 confirms that the first shard 151 is associated with the specified microshard prior to executing the data access request 135.

The mapping component 115 identifies the first server 205 using a discovery process. After the mapping component 115 identifies the first shard 151 to which the data access request 135 is to be forwarded based on the microshard map 130, the discovery process can identify the first server 205 that hosts the first shard 151 using the server-shard map 250 of FIG. 2B. Once the first server 205 is identified, the mapping component 115 can then forward the data access request 135 to the first server 205.

In some embodiments, the processing of the data access request 135 can depend on whether the specified microshard is associated with a migration request. However, the processing of the data access request 135 is transparent to the client device 120 regardless of whether the specified microshard is associated with a migration request. That is, the client device 120 may not have to change its data access request 135 even if the specified microshard is migrated from a source shard, e.g., the first shard 151 to a destination shard as the mapping component 115 ensures that the data access request 135 is forwarded to the appropriate shard. The microshard map 130, as described above, indicates a mapping between the microshards and the shards. If the state of migration of the specified microshard is "not started," then the microshard map 130 would still indicate that the specified microshard is associated with the first shard 151 (e.g., source shard). If the state of migration of the specified microshard is "complete," then the microshard map 130 would be updated, e.g., by the shard manager component 105 on receiving an indication from the migration controller component 110, to indicate that the specified microshard is associated with a first destination shard 161 (e.g., a destination shard of the migration). So a data access request 135 received at the mapping component 115 when the state of migration is "not started" or "complete," the mapping component 115 forwards the data access request 135 to the appropriate shard indicated by the microshard map 130.

However, when the state of migration of the specified microshard is "in process," the destination shard can have only a portion of the specified microshard, and therefore, the microshard map 130 would be not be updated yet to indicate that the specified microshard is migrated over to the destination shard nor would the source shard accept any write requests as the microshards in the source shard are in the process of migrating to the destination shard. When the data access request 135 is received at the mapping component 115 during the "in process" state, the mapping component 115 processes the data access request 135 based on whether it is a read request or a write request. The mapping component 115, based on the microshard map 130, determines that the specified microshard is associated with the first shard 151 (microshard map not updated yet as the migration to the destination shard, e.g., the first destination shard 161, is not complete) and forwards the data access request to the first server 205 that hosts the first shard 151. If the data access request 135 is a read request, the first server 205 executes the data access request 135 on the first shard 151. In some embodiments, the migration is a copy (and not move) of the data from the source to destination and therefore, the source will still have the entire data during the process of migration, e.g., up until the migration is complete and data is deleted from the source. However, if the data access request 135 is a write request, the first server 205 can indicate that the first shard 151 is "write unavailable," e.g., not available for modifying the data as the migration is under process.

The mapping component 115 then refers to a memcache 125 to determine a state of the specified microshard. In some embodiments, the memcache 125 is a distributed data cache that is shared between a number of client devices. For example, the environment 100 can have multiple clusters of client devices in which each cluster has some number of client devices and a memcache that is shared between the client devices in the cluster. The memcache 125 includes a state of each of the microshards that is being migrated. The state of microshard can include information such as a source shard and a destination shard of a particular microshard. When the mapping component 115 receives a "write unavailable" message from the first server 205, the mapping component 115 updates the memcache 125 to indicate that the specified microshard is not available at the source shard, that is, the first shard 151, anymore. In some embodiments, the mapping component 115 also updates the microshard map 130 to indicate that the specified microshard is in transit, e.g., migration is in process, so that the future data access requests are not forwarded to the source shard anymore. Any further data access requests for the specified microshard would be forwarded to the destination shard. At some point, e.g., after the specified microshard is migrated completely to the destination shard, the first server 205 generates an error message indicating that the first shard 151 does not own the specified microshard anymore. The mapping component 115 can then forward the data access request 135 to a server that hosts the destination shard, e.g., the first destination shard 161, which is now associated with the specified microshard. The server executes the data access request 135 on the specified microshard in the first destination shard 161, and can return an acknowledgement to the client device 120. Accordingly, the mapping component 115 enables processing of the data access request 135 in an efficient and transparent manner to the client device 120.

Figure 4:
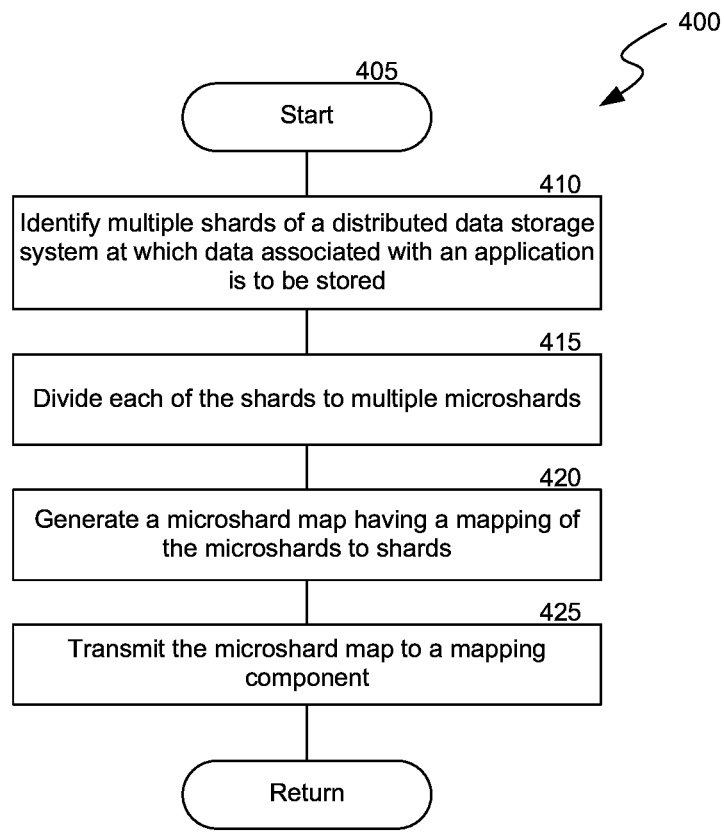
FIG. 4 is a flow diagram of a process of data sharding, consistent with various embodiments.

FIG. 4 is a flow diagram of a process 400 of data sharding, consistent with various embodiments. The process 400 may be executed in an environment 100 of FIG. 1. The process 400 begins at block 405, and at block 410, the shard manager component 105 identifies the multiple shards of a distributed data storage system at which data associated with an application is to be stored. For example, the shard manager component 105 identifies the shards of the distributed data storage system 150.

At block 410, the shard manager component 105 splits each of the shards into a number of microshards. The number of microshards to be generated can be determined based on various factors, e.g., amount of data to be stored in the data storage system 150, and a total number of shards in the data storage system 150. The shard manager component 105 also determines a density of microshards, e.g., the number of microshards per shard. The number of microshards to be generated and the density can also be determined based on various user-configurable policies. In some embodiments, the microshards are numbered using a first sequence and the shards are numbered using a second sequence. The microshard ID can include a sequence number from the first sequence and the shard ID can include a sequence number from the second sequence. For example, a first microshard can have a microshard ID "mS1," a three thousandth microshard can have a microshard ID "mS3000," and so on.

At block 415, the shard manager component 105 generates a microshard map, e.g., microshard map 130, that indicates a mapping between the microshards and the shards. In one representation of the microshard map 130, e.g., the first representation 305, the microshard map 130 can include a total number of the shards and microshards in the data storage system 150 and the density of the microshards. One or more of the values stored in the first representation 303 can be used to determine a shard to which a specified microshard is assigned. In another representation, e.g., the second representation 310, the microshard map 130 can include the microshard IDs mapped to the shard IDs.

At block 420, the shard manager component 105 transmits the microshard map to the mapping component 115. In some embodiments, the mapping component 115 is within a client device and therefore, the microshard map 130 is transmitted to all the client devices. The mapping component 115 can use the microshard map 130 to determine a shard to which a specified microshard is assigned.

Figure 5:
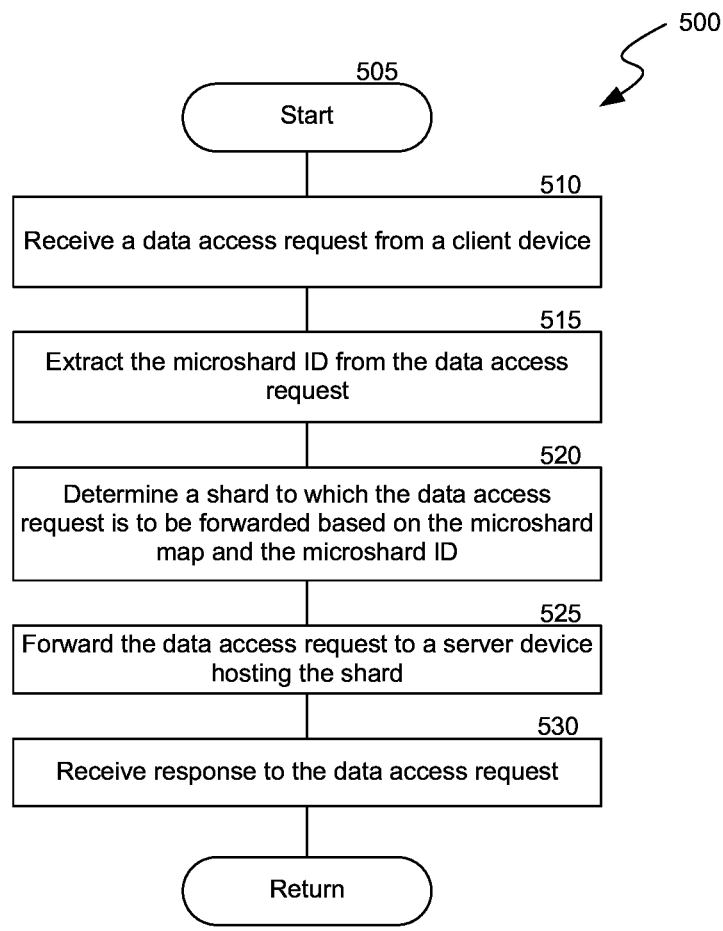
FIG. 5 is a flow diagram of a process for processing a data access request, consistent with various embodiments.

FIG. 5 is a flow diagram of a process 500 for processing a data access request, consistent with various embodiments. The process 500 may be executed in the environment 100 of FIG. 1. The process 500 begins at block 505, and at block 510, the mapping component 115 receives a data access request from a client device, e.g., data access request 135 from the client device 120. The data access request 135 can be generated by the client device 120 or received at the client device 120 from another entity, e.g., a user or an application service that consumes the data stored in the shards.

At block 515, the mapping component 115 extracts the microshard ID from the data access request. In some embodiments, the data in the data storage system 150 is accessible using a microshard ID, e.g., the ID of the microshard in which the data is stored. When data is stored in the data storage system 150, the shard manager component 105 assigns the data to one of the shards, which stores the data in a specified microshard. The shard manager component 105 determines the shard and therefore, the microshard, to which the data is to be assigned based on various user-configurable policies. After the assignments of the microshards to the data are determined, the shard manager component 105 can generate the microshard-data assignment map (not illustrated) and distribute it to the client devices. The client device 120 can then use the microshard-data assignment map to identify the microshard with which the data access request is associated and include the microshard ID in the data access request 135.

At block 520, the mapping component 115 determines a specified shard to which a specified microshard corresponding to the microshard ID is assigned based on the microshard map. In some embodiments, the mapping component 115 determines the specified shard, e.g., the first shard 151, as a function of the microshard ID (e.g., which can be a number in a sequence) and the density of the shards in the microshard map 130. For example, the mapping component 115 can determine that a candidate microshard with microshard ID 5000 belongs to shard S1, by dividing microshard ID "5000" by density "10000" and adding "1" to the quotient if the reminder is greater than 0 to get the value 1, which is shard "S1" ("5000/10000=0+1=1").

At block 525, the mapping component 115 forwards the data access request to a server that hosts the specified shard. In some embodiments, the mapping component 115 identifies the server, e.g., the first server 205, using server-shard map, e.g., the server-shard map 250 of FIG. 2, which indicates a mapping between the servers and shards.

At block 530, the mapping component 115 receives a response from the server. In some embodiments, the mapping component 115 receives the requested data in an event the data access request 135 is a read request. In some embodiments, the mapping component 115 receives an acknowledgement that the data access request 135 is executed successfully in an event the data access request 135 is a write request.

Figure 6:
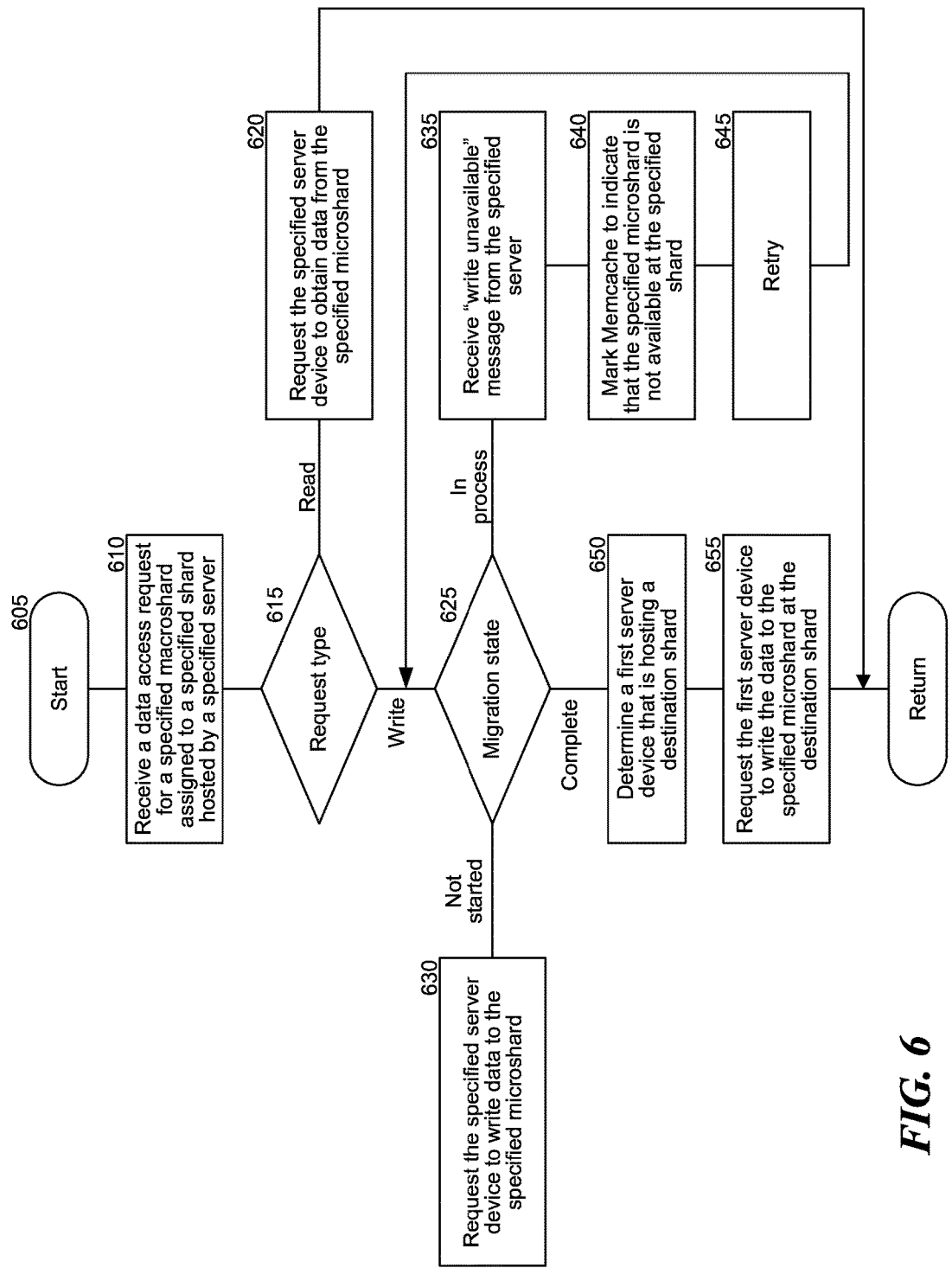
FIG. 6 is a flow diagram of a process for processing a data access request, consistent with various embodiments.

FIG. 6 is a flow diagram of a process 600 for processing a data access request, consistent with various embodiments. The process 600 may be executed in the environment 100 of FIG. 1. The process 600 begins at block 605, and at block 610, the mapping component 115 receives a data access request, e.g., data access request 135 from the client device 120, for a specified microshard hosted by a server, e.g., the first server 205.

At determination block 615, the mapping component 115 determines whether the data access request 135 is a read request or a write request. If the data access request 135 is a read request, at block 620, the mapping component 115 requests the first server 205 to execute the data access request 135 on the first shard 151 to obtain the requested data. If the data access request is a write request, the process 600 proceeds to determination block 625.

At determination block 625, the mapping component 115 determines the migration state of the specified microshard. In some embodiments, the migration state can be indicated by the microshard map 130 and/or by memcache 125. If the migration state of the specified microshard is "not started," at block 630, the mapping component 115 requests the first server 205 to execute the data access request 135 to write the provided data to the specified microshard in the first shard 151.

If the migration state of the specified microshard is "in process," at block 635, the mapping component 115 receives a "write unavailable" message from the first server 205 indicating that the first shard 151 is not available for writing data as the specified microshard is in the process of migration to a destination shard, e.g., the first destination shard 161. At block 640, the mapping component 115 marks the memcache 125 to indicate that the specified microshard is not available in the first shard 151. At block 645, the mapping component 115 retries accessing the first server 205, e.g., after a certain period. In some embodiments, the blocks 635-645 can be repeated, e.g., until the migration state is "complete." In some embodiments, the first server 205 generates an error message stating that the first shard 151 does not have the specified microshard anymore, e.g., after the migration of the specified microshard to the destination shard has completed. The error message is an indication that the migration process has completed.

If the migration state of the specified microshard is "complete," at block 650, the mapping component 115 obtains the destination shard, e.g., the first destination shard 161, of the specified microshard from the microshard map 130 or the memcache 125, and determines a server that hosts the first destination shard 161, e.g., using the server-shard map 250.

At block 655, the mapping component 115 forwards the data access request to the server that hosts the destination shard and requests the server to write the data provided in the data access request 135 to the specified microshard in the destination shard.

Figure 7:
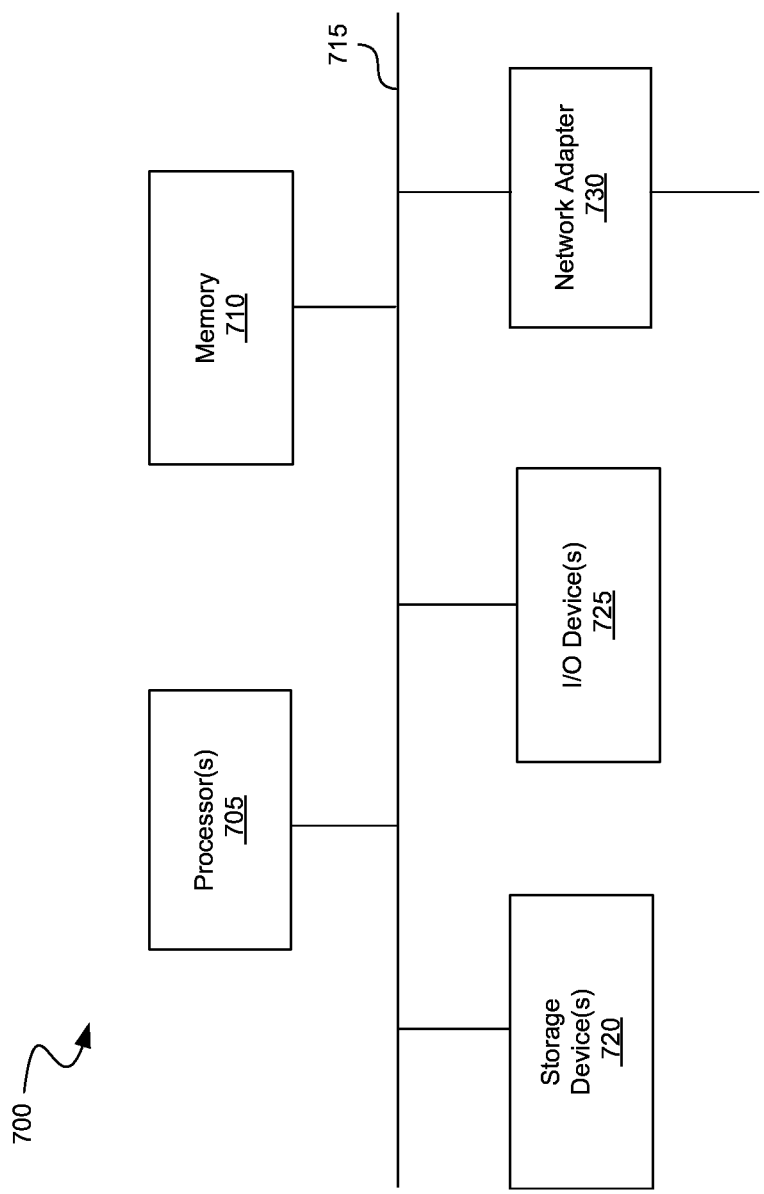
FIG. 7 is a block diagram of a computer system as may be used to implement features of the disclosed embodiments.

FIG. 7 is a block diagram of a computer system as may be used to implement features of the disclosed embodiments. The computing system 700 may be used to implement any of the entities, components, modules, systems, or services depicted in the examples of the foregoing figures (and any other entities described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
   storing, by multiple server devices, data associated with an application across multiple shards, wherein:
      each of the multiple shards stores a subset of the data and is hosted by at least one of the multiple server devices;
      the subset of the data within each of the multiple shards is stored across multiple microshards, wherein each of the multiple microshards is associated with a microshard identification (ID); and
      a shard manager component manages placement of the data across the multiple shards;
   generating, by the shard manager component, a microshard map, the microshard map being used to determine to which of the multiple shards specific microshards are assigned;
   generating, by the shard manager component, a server-shard map, the server-shard map indicating a mapping between each one of the multiple shards and one or more of the multiple server devices hosting the one of the multiple shards;
   transmitting, by the shard manager component, the microshard map and the server-shard map to a mapping component that receives data access requests from client devices to access the data associated with the application;
   managing, by a migration controller component, a migration of a specific microshard from a first one of the multiple shards to a second one of the multiple shards;
   receiving, at the mapping component during the migration, a data access request, the data access request specifying a specific microshard ID, the specific microshard ID being that of the specific microshard;
   determining, by the mapping component using the microshard map, the first one of the multiple shards identified by the specified microshard ID;
   determining, by the mapping component using the server-shard map, a specific one of the multiple server devices hosting the first one of the multiple shards;
   forwarding, by the mapping component, the data access request to the specific one of the multiple server devices;
   receiving, by the specific one of the multiple server devices, the data access request from the mapping component; and
   processing, by the specific one of the multiple server devices, the data access request based on a status of the migration.

2. The computer-implemented method of claim 1, wherein the status of the migration is one of:
   not started;
   in process; or
   completed.

3. The computer-implemented method of claim 1, wherein determining the first one of the multiple shards includes determining the first one of the multiple shards based on a density of the microshards indicated in the microshard map and the microshard ID.

4. The computer-implemented method of claim 3, wherein the density of the microshards indicates a number of microshards per shard.

5. The computer-implemented method of claim 1, wherein processing the data access request includes:
   in response to a determination that the data access request is a write request and the status of the migration is in process, confirming that the specific microshard is not write available; and
   causing, by the specific one of the multiple server devices, the mapping component to wait or retry after a specific period.

6. The computer-implemented method of claim 1, wherein processing the data access request includes, in response to a determination that the data access request is a write request and the status of the migration is not started, writing specified data to the specific microshard.

7. The computer-implemented method of claim 1, wherein processing the data access request includes confirming, by the specific one of the multiple server devices, that the specific microshard is currently associated with a shard hosted by the specific one of the multiple server devices.

8. The computer-implemented method of claim 1, wherein processing the data access request includes confirming, by the specific one of the multiple server devices, that the specific microshard is being migrated from the first one of the multiple shards to the second one of the multiple shards.

9. The computer-implemented method of claim 1, wherein processing the data access request includes, in response to a determination that the data access request is a read request and the status of the migration is not started or in process, retrieving requested data from the specific microshard.

10. The computer-implemented method of claim 1, wherein processing the data access request includes:
    in response to a determination that the data access request is a write request and the status of the migration is in process, confirming that the specific microshard is not write available; and
    causing, by the specific one of the multiple server devices, the client device to wait or retry after a specific period.

11. The computer-implemented method of claim 10 further comprising: notifying, by the mapping component, a memcache that the specific microshard is not available for writing and that the second one of the multiple shards will be available for writing.

12. The computer-implemented method of claim 11, wherein the memcache stores statuses of microshards that are being migrated, and wherein the memcache is a shared storage system that is shared between a set of client devices.

13. The computer-implemented method of claim 10 further comprising:
    receiving, by the mapping component from the specific one of the multiple server devices, a message indicating that the specific microshard is not currently associated with the first one of the multiple shards;
    determining, by the mapping component and using the microshard map, the second one of the multiple shards with which the specific microshard is currently associated;
    determining, by the mapping component and using the server-shard map, an additional specific one of the multiple server devices hosting the first one of the multiple shards; and forwarding, by the mapping component, the data access request to the additional specific one of the multiple server devices.

14. The computer-implemented method of claim 13, wherein the message is sent by the specific one of the multiple server devices in response to the status of the migration of the specific microshard from the specific shard to the second one of the multiple shards being completed.

15. The computer-implemented method of claim 10, wherein confirming that the specific microshard is not write available includes confirming that the status of the migration of the specific microshard from the first one of the multiple shards to the second one of the multiple shards is in process.

16. The computer-implemented method of claim 1, wherein the microshard ID includes a number, wherein microshards are sequentially numbered using a first sequence, and wherein the multiple shards are sequentially numbered using a second sequence.

17. A computer-readable storage medium storing computer-readable instructions, comprising:
   Instructions for storing, by multiple server devices, data associated with an application across multiple shards, wherein:
      each of the multiple shards stores a subset of the data and is hosted by at least one of the multiple server devices;
      the subset of the data within each of the multiple shards is stored across multiple microshards, wherein each of the multiple microshards is associated with a microshard identification (ID); and
      a shard manager component manages placement of the data across the multiple shards;
   instructions for generating, by the shard manager component, a microshard map, the microshard map being used to determine to which of the multiple shards specific microshards are assigned;
   instructions for generating, by the shard manager component, a server-shard map, the server-shard map indicating a mapping between each one of the multiple shards and one or more of the multiple server devices hosting the one of the multiple shards;
   instructions for transmitting, by the shard manager component, the microshard map and the server-shard map to a mapping component that receives data access requests from client devices to access the data associated with the application;
   instructions for managing, by a migration controller component, a migration of a specific microshard from a first one of the multiple shards to a second one of the multiple shards;
   instructions for receiving a data access request at the mapping component, the data access request including a microshard identification (ID) of a specific microshard with which requested data is associated;
   instructions for determining, at the mapping component during the migration, a specific one of the multiple server devices to which the data access request is to be forwarded, wherein the determining includes:
      determining, using the microshard map, the first one of the multiple shards with which the specific microshard is associated; and
      determining, using the server-shard map, the specific one of the multiple server devices based on the first one of the multiple shards;
   instructions for forwarding, from the mapping component, the data access request to the specific one of the multiple server devices; and
   instructions for processing, by the specific one of the multiple server devices, the data access request based on a status of the migration.

18. The computer-readable storage medium of claim 17, wherein the instructions for processing the data access request include:
   instructions for determining that the specific microshard is associated with a data migration request for migrating the specific microshard from the first one of the multiple shards to the second one of the multiple shards.

19. The computer-readable storage medium of claim 18, wherein the instructions for processing the data access request include:
   instructions for fulfilling the data access request if the migration has not started.

20. A system, comprising:
   a processor;
   multiple server devices configured to store data associated with an application across multiple shards, wherein:
      each of the multiple shards stores a subset of the data; and
      the subset of the data within each of the multiple shards is stored across multiple microshards, wherein each of the multiple microshards is associated with a microshard identification (ID);
   a shard manager component configured to:
      manage placement of the data across the multiple shards;
      generate a microshard map, the microshard map being used to determine to which of the multiple shards specific microshards are assigned;
      generate a server-shard map, the server-shard map indicating a mapping between each one of the multiple shards and one or more of the multiple server devices hosting the one of the multiple shards; and
      transmit the microshard map and the server-shard map to a mapping component that receives data access requests from client devices to access the data associated with the application;
   a migration controller component configured to manage a migration of a specific microshard from a first one of the multiple shards to a second one of the multiple shards; and
   the mapping component configured to:
      receive, during the migration, a data access request, the data access request specifying a specific microshard ID, the specific microshard ID being that of the specific microshard;
      determine, using the microshard map, the first one of the multiple shards identified by the specified microshard ID;
      determine, using the server-shard map, a specific one of the multiple server devices hosting the first one of the multiple shards; and
      forward the data access request to the specific one of the multiple server devices, wherein the specific one of the multiple server devices is further configured to process the data access request based on a status of the migration.

* * * * *